US010650462B2

(12) United States Patent
Fitzgerald et al.

(10) Patent No.: US 10,650,462 B2
(45) Date of Patent: May 12, 2020

(54) PROTECTION COVERAGE SELECTION AND ELECTION PROCESSES AND SYSTEMS

(71) Applicant: DealerPolicy, Inc., Colchester, VT (US)

(72) Inventors: Travis M. Fitzgerald, Colchester, VT (US); Jeffrey Mongeon, Colchester, VT (US)

(73) Assignee: DealerPolicy, Inc., Williston, VT (US)

( * ) Notice: Subject to any disclaimer, the term of this patent is extended or adjusted under 35 U.S.C. 154(b) by 845 days.

(21) Appl. No.: 15/142,387

(22) Filed: Apr. 29, 2016

(65) Prior Publication Data
US 2016/0321759 A1 Nov. 3, 2016

Related U.S. Application Data

(60) Provisional application No. 62/155,914, filed on May 1, 2015.

(51) Int. Cl.
G06Q 40/08 (2012.01)
(52) U.S. Cl.
CPC .................................. *G06Q 40/08* (2013.01)
(58) Field of Classification Search
CPC .................................................... G06Q 40/08
See application file for complete search history.

(56) References Cited

U.S. PATENT DOCUMENTS 7,203,734 B2 * 4/2007 Rudy ..................... G06Q 30/06
705/26.1
8,082,163 B2 * 12/2011 Harkensee ........... G06Q 10/087
705/4

(Continued)

FOREIGN PATENT DOCUMENTS

CA 2818637 A1 * 12/2013 ......... G06K 9/00671

OTHER PUBLICATIONS

LaReau, Jamie: Allstate gives dealers a chance to sell more insurance products, Jan. 27, 2012, autonews.com, pp. 1-6 (Year: 2012).*

(Continued)

*Primary Examiner* — Bijendra K Shrestha
(74) *Attorney, Agent, or Firm* — Fenwick & West LLP

(57) ABSTRACT

A protection coverage selection and election process may comprise a user entering through a dealer platform at a direct point of sale location logging in to a protection coverage selection and election platform portal customer information; a user receiving through the dealer platform coverage information, a user accessing through the dealer platform a protection coverage for each coverage selection, and the user communication through the platform portal with a licensed protection coverage agent for a selected protection coverage provider to obtain a finalized arrangement for the protection coverage. The system and process may further comprise prompting the customer, through the platform portal to answer any additional questions to the customer in accordance with any particular requirements of the selected protection coverage provider. The system and method may further comprise the user receiving on behalf of or sending to the customer a link to protection coverage policy documents ready for E-signing.

20 Claims, 2 Drawing Sheets

(56) References Cited

U.S. PATENT DOCUMENTS

| | | | | |
|---|---|---|---|---|
| 8,650,052 | B1* | 2/2014 | Anagnoson | G06Q 40/00 705/36 R |
| 2002/0023048 | A1* | 2/2002 | Buhannic | G06Q 10/10 705/37 |
| 2002/0111835 | A1* | 8/2002 | Hele | G06Q 10/10 705/4 |
| 2002/0120476 | A1* | 8/2002 | Labelle | G06Q 30/02 705/4 |
| 2005/0027572 | A1* | 2/2005 | Goshert | G06Q 40/02 705/4 |
| 2009/0043614 | A1* | 2/2009 | Yee | G06Q 40/02 705/4 |
| 2010/0004957 | A1* | 1/2010 | Ball | G06Q 40/00 705/4 |
| 2013/0103593 | A1* | 4/2013 | Watts | G06Q 30/02 705/302 |
| 2013/0332204 | A1* | 12/2013 | Fiori | G06Q 40/08 705/4 |
| 2014/0074513 | A1* | 3/2014 | Bhatt | G06Q 40/08 705/4 |
| 2015/0178849 | A1* | 6/2015 | Berger | G06Q 40/08 705/4 |
| 2015/0213548 | A1* | 7/2015 | Fisher | G06Q 30/08 705/26.3 |

OTHER PUBLICATIONS

AutoTrader.com: Find Your Car, Feb. 14, 2014, Internet Archives, pp. 1-4 (Year: 2014).*

* cited by examiner

PROTECTION COVERAGE SELECTION AND ELECTION PROCESSES AND SYSTEMS

The present application claims priority to earlier filed U.S. Provisional Patent Applications No. 62/155,914, filed on May 1, 2015, entitled PROTECTION COVERAGE SELECTION AND ELECTION PROCESS, Attorney Docket No. F01-P01-00US. The disclosure of which is incorporated herein by reference.

BACKGROUND

In the art of providing coverage protection, e.g., insurance protection for goods and services in need of same, as examples automobile insurance, renter's insurance, RV insurance, etc., currently, a dealer and a customer may confer and input customer information to a licensed and regulated (in many states) insurance broker (agent), e.g., online through a website for the broker (agent). The insurance agency sales and management software platform, e.g., "Vertafore I™" can provide, e.g., carrier annual premiums. Once a "bindable": quote is received the customer then decides whether to purchase the coverage. If so, then the broker/agent can provide the policy documents, e.g., by email, for the customer to sign and return. The dealer has to fax or email back the policy documents to the agency.

SUMMARY

A protection coverage selection and election process is disclosed, which may comprise a user entering customer information, through a dealer platform at a direct point of sale location, by logging in to a protection coverage selection and election platform portal; a user receiving, through the dealer platform, coverage information identifying a plurality of available coverage selections, a user accessing, through the dealer platform, a protection coverage for each coverage selection, and the user communicating, through the platform portal, with a licensed protection coverage agent for a selected protection coverage provider, to obtain a finalized arrangement for the protection coverage. The system and process may further comprise prompting the customer, through the platform portal, to answer any additional questions to the customer in accordance with any particular requirements of the selected protection coverage provider. The system and method may further comprise the user receiving, on behalf of, or sending to, the customer a link to protection coverage policy documents ready to be E-signed. The system and method may further comprise the user collecting payment from the customer while remaining in direct communication with the customer. The system and method may further comprise integration of the user with Dealer Management Systems and integration of the user with point of sale platforms including Finance or Service contract platforms.

DETAILED DESCRIPTION

Figure 1:
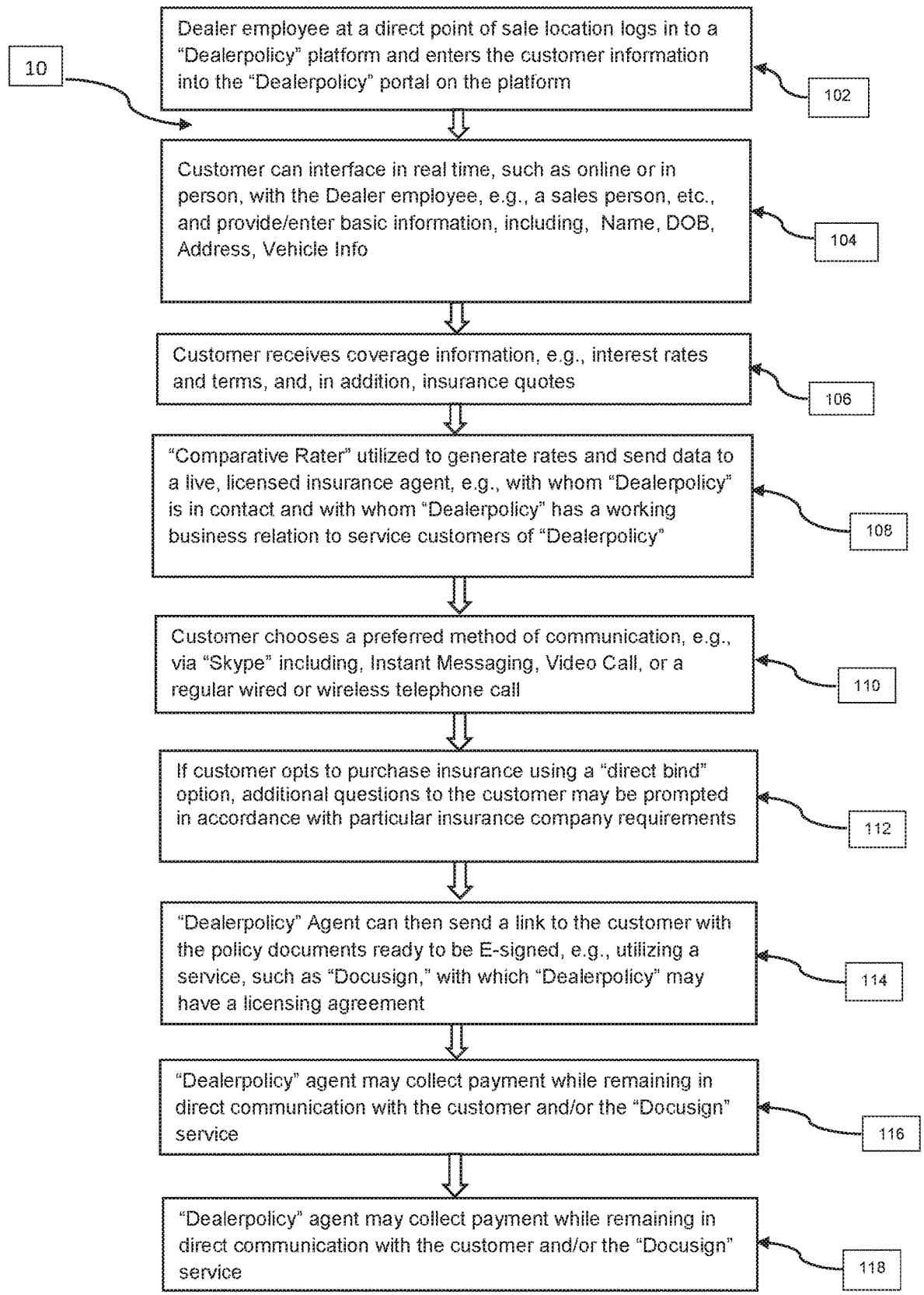
FIG. 1 is a block diagram of a process according to aspects of embodiments of the disclosed subject matter.

According to aspects of embodiments of the disclosed subject matter, a merchant for a product or service, the purchase of which may create for the purchaser a need for a form of protection, such as insurance, may, in real time, and, e.g., as part of the sale process, offer the customer an ability to compare insurance rates and access knowledgeable licensed agents for the customer to purchase also the form of protection, e.g. from an insurance protection provider represented by the licensed agent. As an example, the customer may so purchase auto insurance, boat insurance, home owner's insurance, motorcycle insurance, RV insurance, etc., e.g., utilizing a comprehensive rating platform in real time, e.g., online, which applicants refer to as "DealerPolicy Marketplace." According to aspects of the disclosed subject matter "DealerPolicy Marketplace" may be utilized, e.g., to integrate with various aspects of the consumer's purchase, such as indirect lending platforms (lending), e-menu systems, dealer website providers, customer relationship management ("CRM") and dealer management systems ("DMS"4), and F&I distributors platforms. Such a more efficient workflow can allow the customer to get the highest quality insurance experience at a direct point of sale establishment for the product or service involved, such as, an auto dealership. "DealerPolicy Marketplace," according to aspects of the disclosed subject matter may greatly increase efficiency, e.g., due to the suggested integrations. Revenues for both "DealerPolicy Marketplace" and the dealer partners can be increased and made even more beneficial, e.g., with the addition of backend products such as "GAP" auto insurance, "OEM GAP" auto insurance, and the like for other products and services, warranties, etc.

According to aspects of the disclosed subject matter, e.g., a customer can interface in real time, such as online or in person, with an individual at a dealership, e.g., a finance/insurance manager, a sales person, etc., and provide/enter basic customer information, including, e.g., Name, DOB, Address, Vehicle Info, along with the option of selecting a level of protection/insurance coverage, e.g., good, better, best coverage, or particular coverage options and or riders, etc., by completing an application, in order to receive both interest rates and terms, and, in addition, insurance quotes. An online service, such as "Comparative Rater" can be utilized to generate rates and send data to a live, licensed insurance agent, e.g., with whom "DealerPolicy Marketplace" is in contact and with whom "DealerPolicy Marketplace" has a working business relation to service customers of "DealerPolicy Marketplace."

According to aspects of the disclosed subject matter, e.g., a customer can choose a preferred method of communication, e.g., via an integrated communications selection option, such as a telecommunications application software product, e.g., that specializes in providing video chat and voice calls from computers, tablets, and mobile devices via the Internet to other devices or telephones/smartphones, such as a "Skype™", or "TokBox"™ or "Twilio"™ option. The "Skype™", or "TokBox"™ or "Twilio"™ option may consist, e.g., of three methods of communication including, Instant Messaging, Video Call, or a regular wired or wireless telephone call. The customer may then be given the option of taking one of a plurality of paths in order to close the sale. As an example, the customer may be given the option to "purchase" insurance directly from the insurance company. If the customer opts to purchase insurance using a "direct bind" option, additional questions to the customer may be prompted in accordance with particular insurance company requirements, e.g., to process a final quote using "Rate Call 3™" or like online binding tools.

As noted above, a "DealerPolicy Marketplace" licensed agent and the customer can communicate by means of the built in "Skype™", or "TokBox"™ or "Twilio"™ platform, or the like, in order to discuss, e.g., the available coverages and provide any required answer to any carrier specific question, etc. The "DealerPolicy Marketplace" agent and customer can choose a policy that best fits the customer's needs. According to aspects of embodiments of the disclosed subject matter, backend products, such as GAP insurance, OEM GAP coverage, Warranties, etc., can be offered at this time. The "DealerPolicy Marketplace" agent can then receive on behalf of, or send a link to, the customer, with the insurance coverage policy documents ready to be E-signed. This may be done, according to aspects of the disclosed subject matter, utilizing a service, such as "Docusign™," with which "DealerPolicy Marketplace" may have a licensing agreement. The customer, e.g., throughout the signing process, may be enabled to stay in direct communication with the agent, e.g., online, e.g., through a "Skype™" or "TokBox"™ or "Twilio"™ split screen chat. Charging fees for financing/coverage-initiating services, e.g., a documentation fee and disclosure(s) that may be part of a documentation package prepared for E-signature, may also be integrated into the process of the disclosed subject matter.

Also as part of aspects of the disclosed subject matter a "DealerPolicy Marketplace" agent may collect payment while remaining in direct communication with the customer and/or the "Docusign™" service. The customer and dealer, e.g., the Automobile Dealer, may then be presented with post purchase policy documents, which can be, e.g., directly emailed to them, e.g., a binder, D card, payment receipt, etc. According to aspects of the disclosed subject matter, insurance policy documents can, e.g., be automatically uploaded, by way of example, into a database, e.g., for storage and automated electronic access, such as, a "DealerPolicy Marketplace" agency management system. It will be understood that "DealerPolicy Marketplace" can greatly increase efficiency, e.g., due to the "direct bind" option for consumers.

According to aspects of embodiments of the disclosed subject matter, a user, e.g., in conjunction with a "DealerPolicy Marketplace" agency employee, such as the "DealerPolicy Marketplace" licensed agent, can log in to the "DealerPolicy Marketplace" platform and enter the customer information into the "DealerPolicy Marketplace" portal on the platform. Coverage rates from partner carriers can thus be accessed. The dealer and/or coverage customer at any point can choose a preferred method of communication which can consist of, e.g., instant messaging, video call, or basic phone call. The licensed "DealerPolicy Marketplace" agent can discuss with the insurance coverage customer, e.g., insurance coverage vendor(s) and other related choices and allow the customer to choose the policy that best fits the customer needs and desires. Once a policy is chosen the "DealerPolicy Marketplace" agent can send over the policy docs to the customer in order to be "E signed." The policy documents can be automatically uploaded into a management system, e.g. for storage, e.g., a "DealerPolicy Marketplace" agency management system. According to aspects of the disclosed subject matter, the system and method disclosed can integrate established coverage relationships with dealer management systems and/or lending platforms such as the "Dealertrack" dealer management software, Dealer. com™ automotive website provider credit union dealer/lender network ("CUDL"), etc. and various other 3rd party coverage product offering platforms. As an example, also, a vehicle service contract comparison rater and other various ancillary product offerings could be included. Also, according to aspects of embodiments of the disclosed subject matter, an addition of an option to do "Rate Call 3™" can be added, e.g., to allow the customer to bind and purchase the coverage policy directly through the "DealerPolicy Marketplace" platform.

FIG. 1 shows a block diagram of a process flow for a process 10 according to aspects of embodiments of the disclosed subject matter. In block 102 a dealer employee at a direct point of sale location logs in to a "DealerPolicy Marketplace" platform and enters the customer information into the "DealerPolicy" portal on the platform. In block 104 the customer can interface in real time, such as online or in person, with the Dealer employee, e.g., a finance/insurance manager, a sales person, etc., and provide/enter basic information, including, Name, DOB, Address, Vehicle Info. In block 106 the customer receives coverage information, e.g., interest rates and terms, and, in addition, insurance quotes. In block 108 "Comparative Rater™" can be utilized to generate rates and send data to a live, licensed insurance agent, e.g., with whom "DealerPolicy Marketplace" is in contact and with whom "DealerPolicy Marketplace" has a working business relation to service customers of "DealerPolicy Marketplace." In block 110 the Customer chooses a preferred method of communication, e.g., via "Skype"™ or "TokBox"™ or "Twillo"™ including, Instant Messaging, Video Call, or a regular wired or wireless telephone call. In block 112 if the customer opts to purchase insurance using a "direct bind" option, additional questions to the customer may be prompted in accordance with particular insurance company requirements. In block 114 a "DealerPolicy Marketplace" Agent can then receive on behalf of or send to the customer a link with the policy documents ready to be E-signed, e.g., utilizing a service, such as "Docusign™," with which "DealerPolicy Marketplace" is currently engaged in a licensing agreement. In block 116 the "DealerPolicy Marketplace" agent may collect payment while remaining in direct communication with the customer and/or the "Docusign™" service. In block 118 policy documents can be automatically uploaded into DealerPolicy Marketplace's agency management system.

Figure 2:
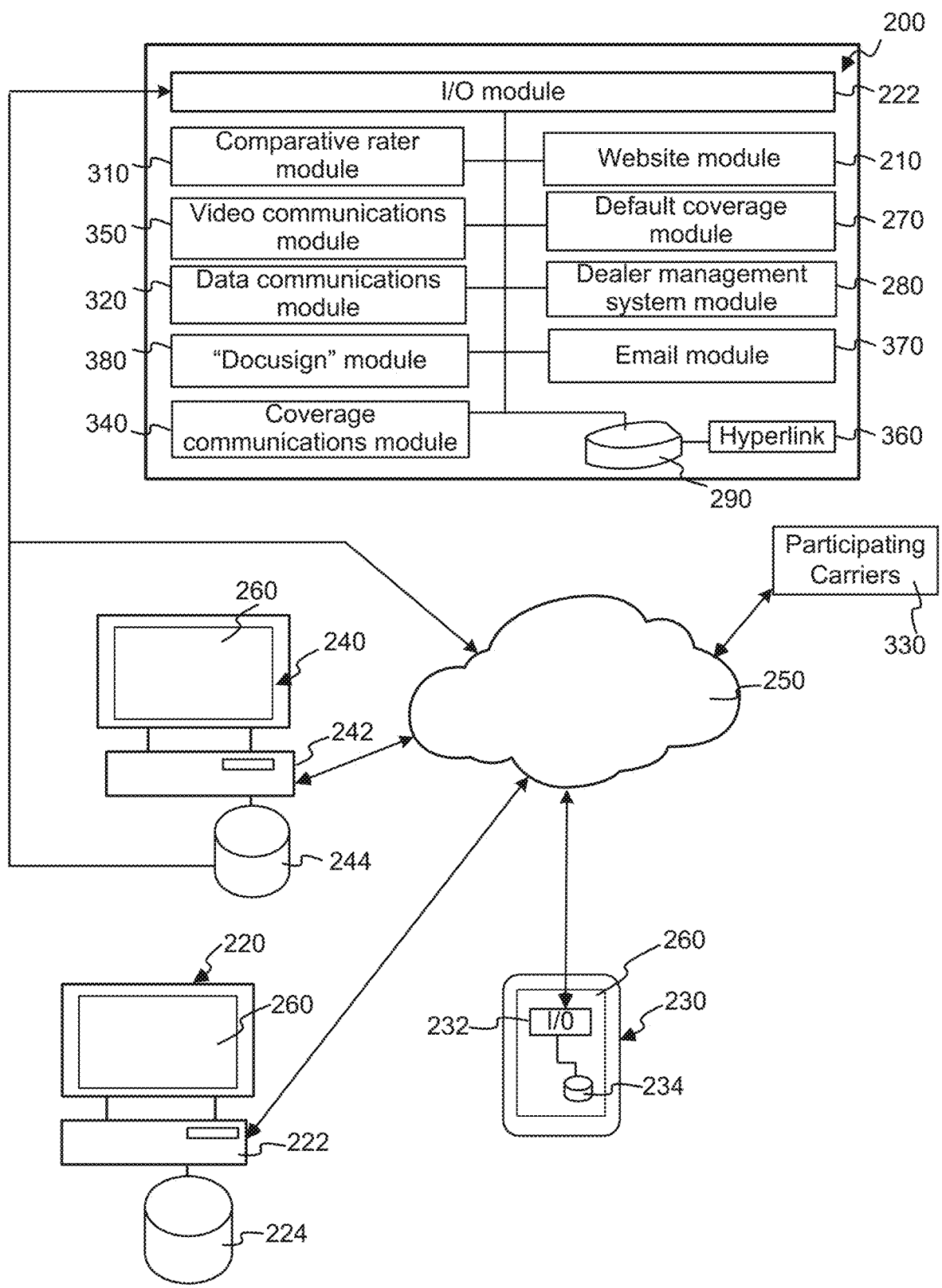
FIG. 2 is a block diagram of a system according to aspects of the disclosed subject matter.

It will be understood by those skilled in the art that the present system and method may comprise a DealerPolicy Marketplace application 200 system and process, as illustrated in block diagram form in FIG. 2, for utilization, e.g., by either or both of the finance and insurance ("F&I") departments or the sales department in a Dealership, for example a vehicle or boat sales dealership, such as an automobile sales dealership, referred to herein as a "Dealer". The DealerPolicy Marketplace (web based application) 200 can offer such a Dealer a more convenient and transparent way to enable customers of the dealership to compare rates from multiple insurance carriers and obtain insurance, e.g., during the process of the sale to the customer of a vehicle/boat. The DealerPolicy Marketplace application 200 can provide a computer based electronic platform that can connect dealerships and/or their customers with licensed insurance agencies and/or their licensed insurance producers, sometimes referred to as a producer or its agent, in real time at a point of sale location, such as the dealership location, The DealerPolicy Marketplace application 200 can enable this to take place without violation of certain types of state insurance statutes and/or regulations, such as those governing the production of insurance and the prohibition against paying commissions to unlicensed persons and entities. Utilization of the computer based DealerPolicy Marketplace application 200 can involve, e.g., the separate steps noted below.

Dealer personnel after, or as part of, e.g., negotiating the sale of a vehicle/boat to a customer, may offer the customer the ability to compare insurance rates and obtain access to knowledgeable licensed insurance producers through the utilization of the DealerPolicy Marketplace application 200. If the customer accepts this offer, the customer may then be directed to log into the DealerPolicy Marketplace application 200, e.g., at a webpage or website, e.g., established by a website module 210 controlled by the DealerPolicy Marketplace application 200. This may be done, e.g., through a dealer computing device 220, e.g., a computer/server terminal, laptop, tablet, etc. at the dealership location, having an I/O component 222 and a storage unit 224 or by having the customer download, e.g., onto a customer/dealership personnel portable computing device 230, such as a cell phone, or iPad belonging to the customer or to the dealership personnel. The personal computing device 230 may have an I/O component 232 and a storage unit 234. Alternatively, the DealerPolicy Marketplace application 200 may reside on a remote server 240, e.g., in a storage unit 244 for the remote server 240, e.g., accessible through an I/O component 242 and having a storage unit 244. The dealer computing device 220 and/or the dealer personnel/customer portable computing device 230 having an interface/portal to the remotely hosted DealerPolicy Marketplace application 200, e.g., over a network, such as the Internet 250.

Disclosures can be made visible to the customer, e.g., on a display 260 of the dealer computer/server 220 or the customer/dealer personnel portable computing device 230, and can be provided to advise the customer that the customer is not purchasing insurance from, or through the Dealer or its personnel, but is instead purchasing insurance from a licensed insurance agency and through the agency's licensed insurance producers, such as participating carriers 330. Accordingly, Dealer personnel can be advised that that they are prohibited from speaking with customers about specific insurance policy terms and conditions, and not to do so. Certain terms regarding the insurance coverage being selected by the customer may, e.g., be initially set, by the DealerPolicy Marketplace application 200 to defaults, such as, default limits of liability (e.g., 100000/300,000/100,000) and the choice of full coverage (e.g., comprehensive and collision coverage with a $500 deductible) for initial rating purposes, and may be included into the Dealer Management System application 200, e.g., as a default coverage module 270, and, e.g., not be displayed to Dealership personnel or to the customer, in order to remove the chance of coverage-related advice being received by the customer from non-licensed individuals. The issue of what limits of liability and what coverage choices are appropriate and necessary, as well as all other issues involving specific insurance policy terms and conditions can be reviewed with the customer through the DealerPolicy Marketplace application 200, but strictly by a licensed insurance producer or its agent.

Dealer personnel can then either pull in the customer's basic information, e.g., via a direct Dealer Management System module 280 of the DealerPolicy Marketplace application 200, e.g. including a Dealer Management System module storage unit 290, e.g., in communication with the Dealer computing device/server 220 or the customer portable computing device 230, or accessible by the DealerPolicy Marketplace application 200, e.g., over the Internet. Alternatively, the information may be entered by or for the customer through, e.g., the Dealer computing device/server 220 or the customer's portable computing device 230. The DealerPolicy Marketplace application 200 can then automatically connect "in real time" the customer with a licensed insurance producer via, e.g. a video communication capability module 300, within the DealerPolicy Marketplace application and in conjunction with the display 260 on the Dealer computing device/server or the customer's personal computing device. This connection takes place, e.g., while the various quotes are being loaded and subsequently displayed on the display screen. The video chat feature can allow the customer to utilize the DealerPolicy Marketplace application 200 software while in direct communication with a licensed insurance producer or its agent throughout the entire insurance discussion. Dealer personnel can, e.g., and as noted above, be limited to the function of entering the customer's basic information only, such as Customer name, address, date of birth, driver's license number, phone number, email address, marital status, residence type, gender, and other pertinent information, e.g., concerning the vehicle/boat, etc. being purchased or leased, accidents, violations or losses of the customer in the past 5 years, current insurance company, current insurance monthly premium, whether customer is eligible for insurance discounts (e.g. homeowners/renters, good student), and related permissions, such as, permission for the DealerPolicy Application 200 to pull the customer's insurance score to provide an accurate quote.

The DealerPolicy Marketplace application 200 software may utilize a comparative rater module 310 as an integral part of the DealerPolicy Marketplace application 200. The DealerPolicy Marketplace application 200 may serve, e.g. as a communications platform, e.g., utilizing a data communications module 320, for communicating requests to each of a plurality of participating insurance carriers 330, e.g., who are licensed to provide the type of insurance coverage in the particular state, e.g., in order to receive "real time" rates based on the particular customer's individual profile. These rates may, e.g., be part of "rate call 1" and, therefore, are only as accurate as what the customer represents with the customer's initial input in to the DealerPolicy Marketplace application 200 system and process (discounts, accidents, violations, etc.). The DealerPolicy Marketplace application 200 can provide to the customer disclosures, e.g., informing the customer that the rates shown are not bindable rates. The customer can then be enabled, e.g., through a DealerPolicy Marketplace application 200 coverage communications module 340, to speak with a licensed insurance producer in order to, e.g., communicate regarding coverage options, answer carrier specific questions, and receive a bindable quote and ultimately bind coverage. At this point, there is no further input from, or involvement needed with, the Dealer personnel. The customer may utilize, e.g., a video communications module 350, e.g., an HD video chat through the DealerPolicy Marketplace application 200, e.g., with the dealer personnel's computing device/server 220 or the customer's portable computing device 230. The licensed insurance producer can be enabled to have access to all of the customer's basic information entered into the DealerPolicy Marketplace application 200 through the Dealer Management System module 280. The licensed insurance producer can then be able to provide a bindable quote to the customer through the DealerPolicy Marketplace application 200 right after the customer answers any carrier specific questions, through the DealerPolicy Marketplace application 200, and the carrier retrieves the customer motor vehicle and CLUE reports, e.g., utilizing the Dealer Management System storage module 290.

The licensed insurance producer or its agent and and customer can also discuss coverages and answer insurer specific application questions through the DealerPolicy Marketplace application system and process 200. With the licensed insurance producer's assistance, the customer can then select the policy that best fits the customer's needs, utilizing the DealerPolicy Marketplace application 200. Once the customer and licensed insurance producer agree on the best policy, through communications over communications of module 320 of the DealerPolicy Marketplace application system and process 200, the licensed insurance producer can then pull the consumer's motor vehicle and CLUE reports in order to provide to the customer, through the DealerPolicy Marketplace application system and process 200, a bindable quote. This process can take place between the customer and the licensed insurance producer while they are in direct contact through the DealerPolicy Marketplace application system and process 200.

The licensed insurance producer can then, e.g., send a hyperlink 360 to the customer, e.g., via an email nodule 370, such as contained in a through a secure Docusign application 380 which may be integrated within the DealerPolicy Marketplace application system and process 200. This hyperlink 360 can allow the customer to view and Docusign™ the necessary policy documentation to bind coverage. When the customer makes a decision and is ready to purchase the particular insurance coverage, the customer can then use the hyperlink 360, e.g., by clicking on the hyperlink 360, which can then prompt the customer to sign the applicable documents using the Docusign™ application module 380. The customer and licensed insurance producer can also continue to remain in contact, through the DealerPolicy Marketplace application system and process 200, while the signature process takes place.

The licensed insurance producer can then collect payment information (e.g., credit card information, etc.) from the customer prior to the communication connection to the customer being disconnected through the communications module 320 in the DealerPolicy Marketplace application 200. The licensed insurance producer can then send all applicable policy documentation by email to the customer and Dealer personnel (to the extent relevant for purchasing the vehicle/boat being purchased). through the DealerPolicy Marketplace application system and process 200. Policy documents can be automatically uploaded and stored in a licensed insurance producer's Agency Management System (not shown).

Following completion of the automobile insurance application and binding process, utilizing the DealerPolicy Marketplace application system and process 200, the customer may be offered the opportunity to review a selection of vehicle service contract options and rates offered by the Dealer. This part of the process can be entirely between the Dealer and the customer, and as such, the licensed insurance producer is not involved in any review and sale of vehicle/boat service contracts.

Referral compensation may be paid by the licensed insurance producer to the Dealer and may not be dependent on the actual binding of coverage. Instead, compensation can be dependent on the licensed insurance producer, based on the consumer expressing an interest in receiving a bindable quote, through the DealerPolicy Marketplace application 200, pulling motor vehicle and CLUE reports, or the like occurrences, preparatory to the customer receiving a bindable quote. As an example, once the licensed insurance producer has entered the motor vehicle record information, the Dealer can be deemed to have earned referral compensation from the licensed insurance producer, whether or not insurance is actually purchased.

According to aspects of the disclosed subject matter, licensed insurance producers may utilize the DealerPolicy Marketplace application system and process 200 and its licensed agents can bring the value of the independent agency to those in need of good advice and a much needed comparison rating option. Because dealer personnel, according the utilization of the DealerPolicy Marketplace application system and process 200, will not be discussing specific insurance policy terms and conditions with customers and payment of referral compensation to the Dealer will not be conditioned on a customers actual purchase of insurance, implementation of the DealerPolicy Marketplace application system and process 200 should not involve the Dealer or its personnel in the negotiation, sale or solicitation of insurance. Moreover, payment of referral compensation to the Dealer by the licensed insurance producer should be permissible.

It is to be understood that the disclosed system and method is not limited in its application to the details of construction and the arrangement of components set forth in the description or illustrated in the described drawings. The disclosed system and method is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as possible additional items. Unless specified or limited otherwise, the terms used are intended to cover the ordinarily known, now or in the future, variations thereof. Further, "connected" and "coupled" are not restricted to physical or mechanical connections or couplings and can include both physical and electrical, magnetic, capacitive and the like couplings and connections.

The following discussion is presented to enable a person skilled in the art to make and use embodiments of the invention. Various modifications to the illustrated embodiment(s) will be readily apparent to those skilled in the art, and the generic principles herein can be applied to other embodiments and applications without departing from the nature of the illustrated embodiment(s) of the disclosed subject matter. Thus, embodiments of the disclosed subject matter are not intended to be limited to those embodiments shown, but are to be accorded the widest scope consistent with the principles and features disclosed in this application. The following detailed description is to be read with reference to the FIGS., in which like elements in different FIGS. have like reference numerals. The FIGS., which are not necessarily to scale, depict selected embodiments and are not intended to limit the scope of embodiments of the disclosed subject matter. Skilled artisans will recognize the examples provided herein have many useful alternatives and fall within the scope of embodiments of the disclosed subject matter.

According to aspects of the disclosed subject matter described in this application the subject matter is in part described with reference to block diagrams and operational illustrations of methods and devices and devices implementing methods (collectively "block diagrams") to provide a user input device. It is understood that each block of the block diagram, and combinations of blocks in the block diagram, can be implemented by means of analog or digital hardware and computer program instructions or combinations thereof, such as in a computing device, as described below.

These computer program instructions can be provided to a processor of a general purpose computer, special purpose computer, microcontroller, ASIC, or any other programmable data processing apparatus, such as a computing device, such that the instructions, when executed via the computing device, implement the functions/acts specified in the block diagram. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation.

In some alternate implementations, the functions/acts noted in the blocks can occur out of the order noted in the block diagram. For example, two blocks shown in succession can in fact be executed substantially concurrently or the blocks can sometimes be executed in the reverse order, depending upon the functionality/acts involved. In addition different blocks may be implemented by different computing devices, such as an array of processors within a computing device(s) operating in series or parallel arrangement, and exchanging data and/or sharing common data storage media.

For the purposes of this disclosure the computer program instructions may be executed on a "server," which will be understood to refer to a service point which provides processing, database, and/or communication facilities. Such may be provided, e.g., to one or more client processors, such as, in the context of the disclosed subject matter, a processor(s) for gathering image data from a linear array scanner and performing image reconstruction on the gathered image data. By way of example, and not limitation, the term "server" can refer to a single physical computing device processor with associated communications and data storage and database facilities. Alternatively it can refer to a networked or clustered complex of computing device processors and associated network, communication and storage devices, as well as operating system software and one or more database systems and applications software, which together support the services provided by the server.

For the purposes of this disclosure, a non-transitory computer readable medium stores computer programs and/or data in computing device machine readable form. By way of example, and not limitation, a computer readable medium can comprise computer storage media and associated tangible communication media. Computer storage media includes volatile and non-volatile, removable and non-removable, media implemented in any method or technology for storage of information such as computer-readable instructions, data structures, program modules, specific applications or other data. All of these may be stored at least temporarily, such as, in cache on the computing device processor, in local main memory associated with the computing device processor, on a local data storage device, such as, a hard or soft disk drive, or in remote storage such as virtual memory space accessible by the computing device processor, directly or through one or more of the noted cache, local main, or local disk drive storage devices. Computer storage media can include, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computing device processor.

For the purposes of this disclosure a module can be considered to be a software, hardware, or firmware (or combinations of these) system, process or functionality, or component thereof, that can perform or facilitate the processes, features, and/or functions described in this application (with or without human interaction or augmentation). A module can include sub-modules. Software components of a module may be stored on a non-transitory computer readable medium. Modules may be integral to one or more servers, or be loaded and executed by one or more servers. One or more modules may be grouped into an engine or an application. Embodiments of the presently disclosed subject matter can utilize information provided by a network which is capable of providing data collected and stored by multiple devices on the network. Such information may include, without limitation, temporal information, spatial information, and user information relating to a specific user or hardware device.

The instructions may be stored on a suitable "machine readable medium" within a computing device or in communication with or otherwise accessible to the computing device. As used in the present application a machine readable medium is a tangible storage device and the instructions are stored in a non-transitory way. At the same time, during operation, the instructions may at some times be transitory, e.g., in transit from a remote storage device to a computing device over a communication link. However, when the machine readable medium is tangible and non-transitory, the instructions will be stored, for at least some period of time, in a memory storage device, such as a random access memory (RAM), read only memory (ROM), a magnetic or optical disc storage device, or the like, arrays and/or combinations of which may form a local cache memory, e.g., residing on a processor integrated circuit, a local main memory, e.g., housed within an enclosure for a processor of a computing device, a local electronic or disc hard drive, a remote storage location connected to a local server or a remote server access over a network, or the like. When so stored, the software will constitute a "machine readable medium," that is both tangible and stores the instructions in a non-transitory form. At a minimum, therefore, the machine readable medium storing instructions for execution on an associated computing device will be "tangible" and "non-transitory" at the time of execution of instructions by a processor of a computing device and when the instructions are being stored for subsequent access by a computing device.

The following is a disclosure by way of example of a known computing device which may be used with the presently disclosed subject matter. The description of the various components of a computing device is not intended to represent any particular architecture or manner of interconnecting the components. Other systems that have fewer or more components may also be used with the disclosed subject matter. A communication device may constitute a form of a computing device and may at least include, contain, utilize or emulate a computing device. The computing device may include an interconnect (e.g., bus and system core logic), which can interconnect such components of a computing device to a data processing device, such as a processor(s) or a microprocessor(s) or a controller(s), or other form of partly or completely programmable or pre-programmed device, e.g., hard wired and/or application specific integrated circuit ("ASIC") customized logic circuitry, such as may implement, e.g., a controller or microcontroller, a digital signal processor, or any other form of device that can fetch and perform instructions, operate on pre-loaded/pre-programmed instructions, and/or follow instructions found in hard-wired or customized circuitry, such as above noted forms of hard-wired circuitry containing logic circuitry, in order to carry out logic operations that, together, perform steps of and whole processes and functionalities as described in the present disclosure.

In this description, various functions, functionalities and/or operations may be described as being performed by or caused by software program code to simplify description. However, those skilled in the art will recognize that what is meant by such expressions is that the functions resulting from execution of the program code/instructions are performed by a computing device as described in the present application, e.g., including a processor, such as a microprocessor, microcontroller, logic circuit, or the like, noted above. Alternatively, or in combination, the functions and operations can be implemented using special purpose circuitry, with or without software instructions, such as using an Application-Specific Integrated Circuit(s) (ASIC) or a Field-Programmable Gate Array(s) (FPGA), which may be programmable, partly programmable or hard wired. The application specific integrated circuit ("ASIC") logic may be such as gate arrays or standard cells, or the like, implementing customized logic by metalization(s) interconnects of the base gate array ASIC architecture or selecting and providing metalization(s) interconnects between standard cell functional blocks included in a manufacturer's library of functional blocks, etc. Embodiments can thus be implemented using hard wired circuitry without program software code/instructions, or in combination with circuitry using programmed software code/instructions.

Thus, the techniques are limited neither to any specific combination of hardware circuitry and software, nor to any particular tangible source for the instructions executed by the data processor(s) within the computing device, such as a tangible machine readable medium. In other words, as an example only, part or all of the machine readable medium may, in part or in full, form a part of the, or be included within the computing device itself, e.g., as the above noted hard wiring or pre-programed instructions in any memory utilized by or in the computing device.

While some embodiments can be implemented in fully functioning computers and computer systems, various embodiments are capable of being distributed as a computing device including, e.g., a variety of architecture(s), form(s) or component(s). Embodiments may be capable of being applied regardless of the particular type of machine or tangible machine/computer readable media used to actually effect the performance of the functions and operations and/or the distribution of the performance of the functions, functionalities and/or operations.

The interconnect may connect the data processing device to defined logic circuitry including, e.g., a memory. The interconnect may be internal to the data processing device, such as coupling a microprocessor to on-board cache memory, or external (to the microprocessor) memory such as main memory, or a disk drive, or external to the computing device, such as a remote memory, a disc farm or other mass storage device(s), etc.

The inter-connect in addition to interconnecting such as microprocessor(s) and memory may also interconnect such elements to a display controller and/or display device, and/or to other peripheral devices such as an input/output (I/O) device(s), e.g., through an input/output controller(s). Typical I/O devices can include a mouse, a keyboard(s), a modem(s), a network interface(s), a printer(s), a scanner(s), a digital or video camera(s) and other devices which are well known in the art. The interconnect may include one or more buses connected to one another through various forms of a bridge(s), a controller(s) and/or an adapter(s). In one embodiment an I/O controller may include a USB (Universal Serial Bus) adapter for controlling a USB peripheral(s), and/or an IEEE-1394 bus adapter for controlling an IEEE-1394 peripheral(s).

The storage device, i.e., memory may include any tangible machine readable media, which may include but are not limited to recordable and non-recordable type media such as a volatile or non-volatile memory device(s), such as volatile RAM (Random Access Memory), typically implemented as a dynamic RAM (DRAM) which requires power continually in order to refresh or maintain the data in the memory, and a non-volatile ROM (Read Only Memory), and other types of non-volatile memory, such as a hard drive, flash memory, detachable memory stick, etc. Non-volatile memory typically may include a magnetic hard drive, a magnetic/optical drive, or an optical drive (e.g., a DVD RAM, a CD ROM, a DVD or a CD), or other type of memory system which maintains data even after power is removed from the system.

A server could be made up of one or more computing devices. A server can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with another computing device(s) positioned locally or remotely to execute instructions, e.g., to perform certain algorithms, calculations and other functions as may be included in the operation of the system(s) and method(s) of the disclosed subject matter, as disclosed in the present application.

At least some aspects of the disclosed subject matter can be embodied, at least in part, in programmed software code/instructions. That is, the functions, functionalities and/or operations and techniques may be carried out in a computing device or other data processing system in response to its processor, such as a microprocessor, executing sequences of instructions contained in a memory or memories, such as ROM, volatile RAM, non-volatile memory, cache or a remote storage device. In general, the routines executed to implement the embodiments of the disclosed subject matte ay be implemented as part of an operating system or a specific application, component, program, object, module or sequence of instructions usually referred to as a "computer program(s)," or "software." The computer program(s) typically comprise instructions stored at various times in various tangible memory and storage devices, e.g., in a computing device, such as in cache memory, main memory, internal disk drives, and/or above noted forms of external memory, such as remote storage devices, such as a disc farm, remote memory or databases, e.g., accessed over a network, such as the Internet. When read and executed by a computing device, e.g., by a processor(s) in the computing device, the computer program causes the computing device to perform a method(s), e.g., process and operation steps to execute an element(s) as part of some aspect(s) of the system(s) or method(s) of the disclosed subject matter.

A tangible machine readable medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations as noted above. Further, the program software code/instructions can be obtained from remote storage, including, e.g., through centralized servers or peer to peer networks and the like. Different portions of the software program code/instructions and data can be obtained at different times and in different communication sessions or in a same communication session, e.g., with one or many storage locations.

The software program code/instructions and data can be obtained in their entirety prior to the execution of a respective software application by the computing device. Alternatively, portions of the software program code/instructions and data can be obtained dynamically, e.g., just in time, when needed for execution. Alternatively, some combination of these ways may be used for obtaining the software program code/instructions and data may occur, as an example, for different applications, components, programs, objects, modules, routines or other sequences of instructions or organization of sequences of instructions. Thus, it is not required that the data and instructions be on a single machine readable medium in entirety at any particular instant of time or at any instant of time ever.

In general, a tangible machine readable medium can include any tangible mechanism that provides (i.e., stores) information in a form accessible by a machine (e.g., a computing device), which may be included, e.g., in a communication device, a network device, a personal digital assistant, a mobile communication device, whether or not able to download and run applications from the communication network, such as the Internet, e.g., an I-phone, Blackberry, Droid, or the like, a manufacturing tool, or any other device including a computing device, comprising, e.g., one or more data processors, etc. In an embodiment(s), a user terminal can be a computing device, such as in the form of or included within a PDA, a cellular phone, a notebook computer, a personal desktop computer, a point of sale device, etc. Alternatively, any traditional communication client(s) may be used in some embodiments of the disclosed subject matter. While some embodiments of the disclosed subject matter have been described in the context of fully functioning computing devices and computing systems, those skilled in the art will appreciate that various embodiments of the disclosed subject matter are capable of being distributed, e.g., as a system, method and/or software program product in a variety of forms and are capable of being applied regardless of he particular type of computing device machine or machine readable media used to actually effect the distribution.

Although some of the drawings may illustrate a number of operations in a particular order, functions, functionalities and/or operations which are not now known to be order dependent, or become understood to not be order dependent, may be reordered. Other functions, functionalities and/or operations may be combined or broken out. While some reordering or other groupings may have been specifically mentioned in the present application, others will be or may become apparent to those of ordinary skill in the art and so the disclosed subject matter does not present an exhaustive list of alternatives. It should also be recognized that the aspects of the disclosed subject matter may be implemented in parallel or seriatim in hardware, firmware, software or any combination(s) of these, co-located or remotely located, at least in part, from each other, e.g., in arrays or networks of computing devices, over interconnected networks, including the Internet, and the like.

The disclosed subject matter is described in the present application with reference to one or more specific exemplary embodiments thereof. Such embodiments are provided by way of example only. It will be evident that various modifications may be made to the disclosed subject matter without departing from the broader spirit and scope of the disclosed subject matter as set forth in the appended claims. The specification and drawings are, accordingly, to be regarded in an illustrative sense for explanation of aspects of the disclosed subject matter rather than a restrictive or limiting sense. Numerous variations, changes, and substitutions will now occur to those skilled in the art without departing from the disclosed subject matter. It should be understood that various alternatives to the embodiments of the disclosed subject matter described as part of the disclosed subject matter may be employed in practicing the disclosed subject matter. It is intended that the following claims define the scope of the disclosed subject matter and that methods and structures within the scope of these claims and their equivalents be covered by the following claims.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

According to aspects of embodiments of the disclosed subject matter customers and automobile dealers, as well as insurance coverage brokers can save a great deal of time. In some cases, finally selected and approved policies can be issued in as little as 10 minutes or less, and in conjunction with the customer selecting the product or service for which the coverage is needed. Dealerships can, therefore, e.g., close more e deals, increase back-end revenues, expand promotional offerings, improve customer service reputation and get access to renters, home owners and other business coverage policies. The "DealerPolicy" user, such as an automobile dealership, or an employee of the dealership, can have access to customer policy documents at all times, e.g., for indirect lending.

"DealerPolicy" can be utilized to work closely with approved dealers/users and to offer them fast access to a large and competitive pool of insurance coverage providers and brokers/agents, thereof, e.g., for all pertinent insurance carriers in the industry. This can provide a benefit of enabling the dealership customer (purchasing a product or service at the dealership), access to the most competitive insurance products in the industry and a tool for their comparison.

Various features and advantages of the invention are set forth in the following claims.

What is claimed is:

1. A protection coverage selection and election method comprising:
receiving, at a platform processor, from a first user processor at a direct point of sale location, user information associated with a second user;
sending, by the platform processor, the user information to provider processors;
receiving, at the platform processor from a subset of the provider processors, coverage information for available coverage selections chosen based in part on the user information, wherein each available coverage selection is received from a provider processor of the subset of provider processors and is associated with an available licensed coverage provider, and wherein each available licensed coverage provider is licensed to provide the associated available coverage selection in a jurisdiction of the direct point of sale location;

sending, from the platform processor for display on a user interface of the first user processor, the coverage information for the available coverage selections, wherein one or more terms associated with the coverage information are not displayed on the user interface of the first user processor;

receiving, from the first user processor, selection of an available licensed coverage provider associated with an available coverage selection and a provider processor from the subset of provider processors;

processing, by the platform processor, a bindable quote associated with the available coverage selection between the second user and the selected licensed coverage provider; and opening, by the platform processor, a direct communication channel between a second user processor associated with the second user and the provider processor associated with the selected licensed coverage provider.

2. The process of claim 1 further comprising:

receiving, at the platform processor from the provider processor of the selected licensed coverage provider, a request for additional information about the second user, wherein the additional information includes user answers to one or more questions associated with the selected licensed coverage provider; and sending from the platform processor to the second user processor, a request to provide the additional information.

3. The method of claim 1, further comprising:

sending, from the platform processor to the first user processor, a link to documents associated with the selected licensed coverage provider and a request for the second user to sign the documents.

4. The method of claim 1, further comprising:

receiving, at the platform processor, input from the second user, the input comprising one or more preparatory actions associated with the selected licensed coverage provider; and responsive to receiving input, receiving an indication that the provider processor associated with the selected licensed coverage provider provided referral compensation to the first user processor based on the one or more preparatory actions.

5. The method of claim 1, wherein the information associated with the second user is integrated with a management system module of the first user processor, wherein the management system module sends the user information to the provider processors.

6. The method of claim 5, wherein the information associated with the second user is integrated with a comparative rater module of the first user processor, wherein the comparative rater module generates rates based on the user information.

7. A protection coverage selection and election system comprising:

one or more computer processors for executing computer program instructions; and a non-transitory computer-readable storage medium storing instructions executable by the one or more computer processor to perform steps comprising:

receiving, at a platform processor, from a first user processor at a direct point of sale location, user information associated with a second user;

sending, by the platform processor, the user information to provider processors;

receiving, at the platform processor from a subset of the provider processors, coverage information for available coverage selections chosen based in part on the user information, wherein each available coverage selection is received from a provider processor of the subset of provider processors and is associated with an available licensed coverage provider, and wherein each available licensed coverage provider is licensed to provide the associated available coverage selection in a jurisdiction of the direct point of sale location;

sending, from the platform processor for display on a user interface of the first user processor, the coverage information for the available coverage selections, wherein one or more terms associated with the coverage information are not displayed on the user interface of the first user processor;

receiving, from the first user processor, selection of an available licensed coverage provider associated with an available coverage selection and a provider processor from the subset of provider processors;

processing, by the platform processor, a bindable quote associated with the available coverage selection between the second user and the selected licensed coverage provider; and opening, by the platform processor, a direct communication channel between a second user processor associated with the second user and the provider processor associated with the selected licensed coverage provider.

8. The system of claim 7, wherein the steps further comprise:

receiving, at the platform processor from the provider processor of the selected licensed coverage provider, a request for additional information about the second user, wherein the additional information includes user answers to one or more questions associated with the selected licensed coverage provider; and sending from the platform processor to the second user processor, a request to provide the additional information.

9. The system of claim 7, wherein the steps further comprise:

sending, from the platform processor to the first user processor, a link to documents associated with the selected licensed coverage provider and a request for the second user to sign the documents.

10. The system of claim 7, further comprising:

receiving, at the platform processor, user input from the second user, the input comprising one or more preparatory actions associated with the selected licensed coverage provider; and responsive to receiving input, receiving an indication that the provider processor associated with the selected licensed coverage provider provided referral compensation to the first user processor based on the one or more preparatory actions.

11. The system of claim 7, wherein the information associated with the second user is integrated with a management system module of the first user processor, wherein the management system module sends the user information to the provider processors.

12. The system of claim 11, wherein the information associated with the second user is integrated with a comparative rater module of the first user processor, wherein the comparative rater module generates rates based on the user information.

13. A non-transitory machine readable storage medium containing instructions, which, when executed by a computing device cause the computing device to execute steps comprising:

receiving at a platform processor, from a first user processor at a direct point of sale location, user information associated with a second user;

sending, by the platform processor, the user information to provider processors;

receiving, at the platform processor from a subset of the provider processors, coverage information for available coverage selections chosen based in part on the user information, wherein each available coverage selection is received from a provider processor of the subset of provider processors and is associated with an available licensed coverage provider, and wherein each available licensed coverage provider is licensed to provide the associated available coverage selection in a jurisdiction of the direct point of sale location;

sending, from the platform processor for display on a user interface of the first user processor, the coverage information for the available coverage selections, wherein one or more terms associated with the coverage information are not displayed on the user interface of the first user processor;

receiving, from the first user processor, selection of an available licensed coverage provider associated with an available coverage selection and a provider processor from the subset of provider processors;

processing, by the platform processor, a bindable quote associated with the available coverage selection between the second user and the selected licensed coverage provider; and opening, by the platform processor, a direct communication channel between a second user processor associated with the second user and the provider processor associated with the selected licensed coverage provider.

14. The storage medium of claim 13, wherein the steps further comprise:

receiving, at the platform processor from the provider processor of the selected coverage provider, a request for additional information about the second user, wherein the additional information includes user answers to one or more questions associated with the selected licensed coverage provider; and sending from the platform processor to the second user processor, a request to provide the additional information.

15. The storage medium of claim 13, wherein the steps further comprise:

sending, from the platform processor to the first user processor, a link to documents associated with the selected licensed coverage provider and a request for the second user to sign the documents.

16. The storage medium of claim 13, further comprising:

receiving, at the platform processor, input from the second user, the input comprising one or more preparatory actions associated with the selected licensed coverage provider; and responsive to receiving input, receiving an indication that the provider processor associated with the selected licensed coverage provider provided referral compensation to the first user processor based on the one or more preparatory actions.

17. The storage medium of claim 13, wherein the information associated with the second user is integrated with a management system module of the first user processor, wherein the management system module sends the user information to the provider processors.

18. The storage medium of claim 17, wherein the information associated with the second user is integrated with a comparative rater module of the first user processor, wherein the comparative rater module generates rates based on the user information.

19. A protection coverage selection and election system comprising:

comprising:

a first user processor configured to provide, to a platform processor, user information associated with a second user, the first user processor at a direct point of sale location;

a second user processor associated with the second user;

a plurality of provider processors configured to provide available coverage selections chosen based in part on the user information, wherein each available coverage selection is associated with an available licensed coverage provider that is licensed to provide the available coverage selection in a jurisdiction of the direct point of sale location; and the platform processor comprising:

a data communications module configured to send user information received from the first user processor to the plurality of provider processors and to receive, from a subset of the plurality of provider processors, coverage information for available coverage selections;

a website module configured to provide for display on a user interface of a first user processor, the coverage information for the available coverage selections, wherein one or more terms associated with the coverage information are not displayed on the user interface of the first user processor; and a coverage communications module configured to 1) process a bindable quote between the second user and a selected licensed coverage provider, the bindable quote based on a coverage selection associated with the selected licensed coverage provider, and 2) open a direct communication channel between the second user processor and a provider processor associated with the selected licensed coverage provider.

20. The system of claim 19, wherein the platform processor further comprises a default coverage module configured to set one or more default coverage options for the coverage selections.

* * * * *